Jan. 8, 1963   A. C. WICKMAN   3,071,985
EPICYCLIC POWER TRANSMISSION MECHANISMS
Filed Oct. 18, 1960   2 Sheets-Sheet 1

Inventor
A. C. Wickman
By Alcock Downing Seebold
Attys.

Jan. 8, 1963 A. C. WICKMAN 3,071,985
EPICYCLIC POWER TRANSMISSION MECHANISMS
Filed Oct. 18, 1960 2 Sheets-Sheet 2

Inventor
A. C. Wickman
By Glascock Downing Seebold
Attys.

United States Patent Office 3,071,985
Patented Jan. 8, 1963

3,071,985
EPICYCLIC POWER TRANSMISSION
MECHANISMS
Axel C. Wickman, 14 S. Hibiscus Drive,
Miami Beach, Fla.
Filed Oct. 18, 1960, Ser. No. 63,321
Claims priority, application Great Britain Oct. 23, 1959
3 Claims. (Cl. 74—761)

This invention relates to variable speed epicyclic power transmission mechanisms for road vehicles, of the kind adapted to be driven by an engine through a so-called double clutch, the latter serving to drive two different input shafts of the mechanism.

The object of the invention is to enable a large range of speed variations and a reverse drive to be provided in a mechanism of simple form.

A mechanism of the type aforesaid in accordance with the invention comprises the combination of two sun pinions of different diameters arranged to be driven by different parts of a double clutch, a pair of reaction members having control means associated therewith, a planet pinion carrier serving as the power output member, an assembly of planet pinions mounted on the carrier in engagement with the said sun pinions and reaction members, and an internally toothed annulus with associated control means in engagement with an appropriate planet pinion or pinions for effecting reverse rotation of the planet pinion carrier.

Figure 1:
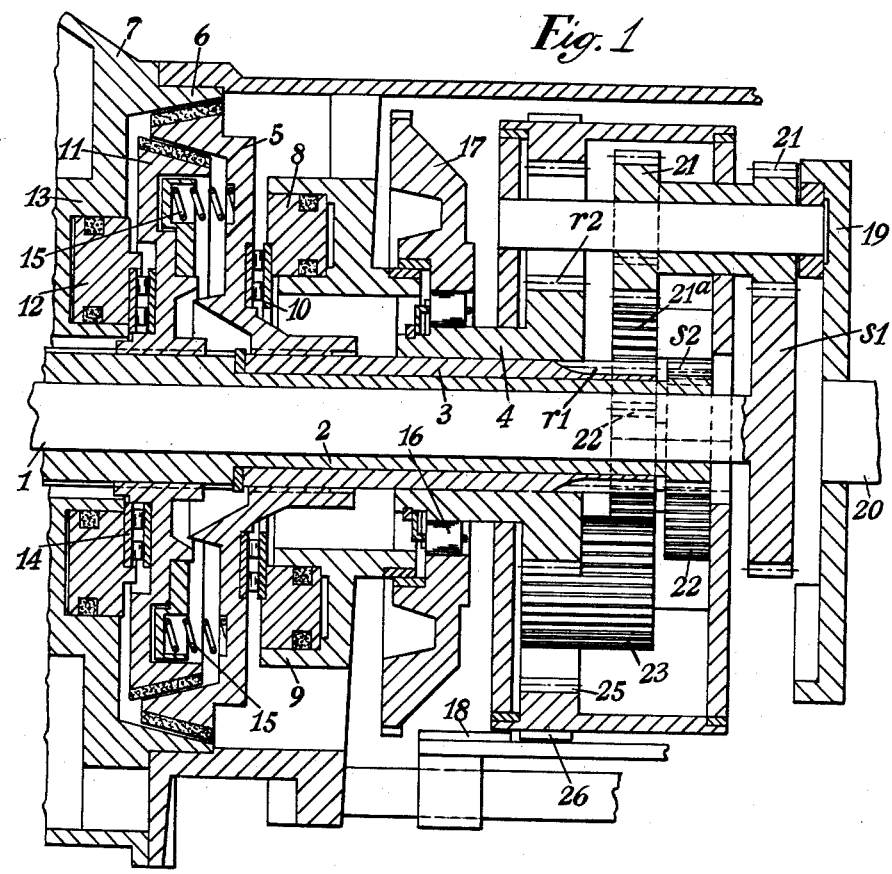
FIGURE 1 is a sectional view illustrating a 5-speed forward and a reverse drive mechanism embodying the invention.
Figure 1A:
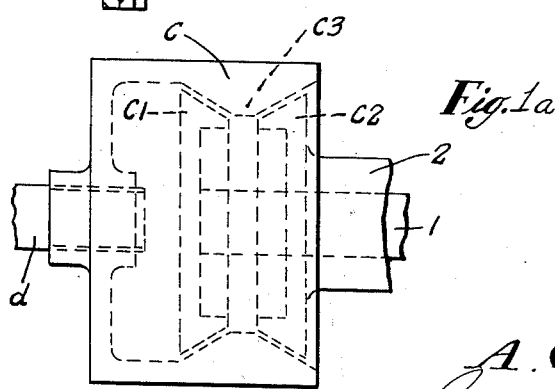
FIGURE 1a is a diagrammatic side view of the double clutch.

The double clutch illustrated diagrammatically in FIGURE 1a comprises an axially movable and rotatable hollow cylindrical body part $c$ which at one end has a splined connection with a coaxial driving shaft $d$, and at the opposite end is open, and a pair of rotatable and axially immovable annular portions $c1$ and $c2$ which are situated in spaced relationship coaxially within the hollow cylindrical body part $c$, and are provided respectively with oppositely disposed truncated conical outer peripheries between which extends a complementary annular projection $c3$ on the internal periphery of the hollow cylindrical body part $c$, the latter being axially movable in opposite directions conventionally under the control of the driver. When the hollow cylindrical body part $c$ is moved axially in one direction the annular projection $c3$ therein frictionally engages the outer periphery of the annular portion $c1$, and transmits rotation thereto from the driving shaft $d$, and when the hollow cylindrical body part $c$ is moved axially in the opposite direction the annular projection $c3$ therein frictionally engages the outer periphery of the other annular portion $c2$, and transmits rotation thereto from the driving shaft $d$.

Referring to FIGURE 1 a central input shaft 1 has a sun pinion $s1$ formed on or secured to it, this shaft being arranged to be driven by the portion $c1$ of the double clutch. On this shaft is supported a concentric sleeve 2 which serves as a second input shaft arranged to be driven by the other portion $c2$ of the double clutch, and on this sleeve is formed or secured a sun pinion $s2$, the sun pinion $s1$ being of appropriately different diameter from that of the sun pinion $s2$.

Two other concentric sleeves 3, 4, are mounted on the second input shaft. The sleeve 3 has formed on or secured to it a reaction pinion $r1$, and the sleeve 4 has formed on or secured to it a reaction pinion $r2$, the pinions $r1$, $r2$ being of appropriate relative diameters.

The sleeve 3 has attached to it a clutch member 5 having a truncated conical periphery adapted for frictional engagement with a complementary brake member 6 formed on or secured to the housing 7. The clutch member 5 is movable into engagement with the brake member 6 by a hydraulically operable annular piston 8 under the control of the driver, the said piston being contained in an annular cylinder 9, and being caused to move the clutch member 5 through an intermediate thrust ring 10.

The input shaft 2 has attached to it a clutch member 11 having a truncated conical periphery adapted for frictional engagement with a complementary inner periphery of the clutch member 5. The clutch member 11 is movable into engagement with the clutch member 5 by a hydraulically operable annular piston 12 under the control of the driver, the said piston being contained in an annular cylinder 13, and being arranged to act on the clutch member 11 through an intermediate thrust ring 14. Separation of the clutch member 5 from the brake member 6, and of the clutch member 11 from the clutch member 5 is effected by a spring or springs 15 located between the clutch members 5, 11.

The sleeve 4 associated with the reaction pinion $r2$ is connected through a unidirectional brake 16 with a freely rotatable disc 17 having a toothed periphery which can be engaged by a slidable pawl 18 under the control of the driver.

The planet pinion carrier 19 serves as the output member, and is connected to an output shaft 20 coaxial with the input shafts 1, 2. On the carrier is mounted an assembly of interengaging planet pinions. These include a compound pinion 21 adapted to interengage the sun pinion $s1$ and reaction pinion $r1$ (through an intermediate pinion 21a), and a compound pinion 22 adapted to interengage the sun pinion $s2$ and a planet pinion 23. The pinion 23 engages the reaction pinion $r2$ and also an internally toothed annulus 25. The planet pinion carrier is also provided with external teeth 26 which can be engaged by the above mentioned pawl 18.

The arrangement is such that to obtain the first speed, motion is given to the input shaft 1 for rotating the sun pinion $s1$, the member 17 being held against rotation by the pawl 18. In this condition backward rotation of the reaction pinion $r2$ is prevented by the unidirectional clutch 16.

To obtain the second speed, the sun pinion $s2$ is driven by the input shaft 2, the reaction pinion $r2$ remaining locked.

To obtain the third speed, the sun pinion $s1$ is driven by the input shaft 1 and the reaction pinion $r1$ is locked to the housing by inter-engagement of the clutch member 5 and the brake member 6.

To obtain the fourth speed, the sun pinion $s2$ is driven by the input shaft 2, the reaction pinion $r1$ remaining locked by the clutch and brake members 5, 6.

The fifth speed is obtained by interengagement of the clutch members 5, 11 (the clutch member 5 being disengaged from the brake member 6) thereby interlocking the input shaft 2 and the pinions $s2$ and $r1$.

To obtain the reverse drive, the sun pinion $s1$ is driven by the input shaft 1, and the annulus 25 is held stationary by engagement of the pawl 18 with the teeth 26 on the planet pinion carrier, the member 17 being released.

When the third, fourth and fifth speeds are in action the reaction pinion $r2$ overruns the unidirectional brake 16.

Figure 2:
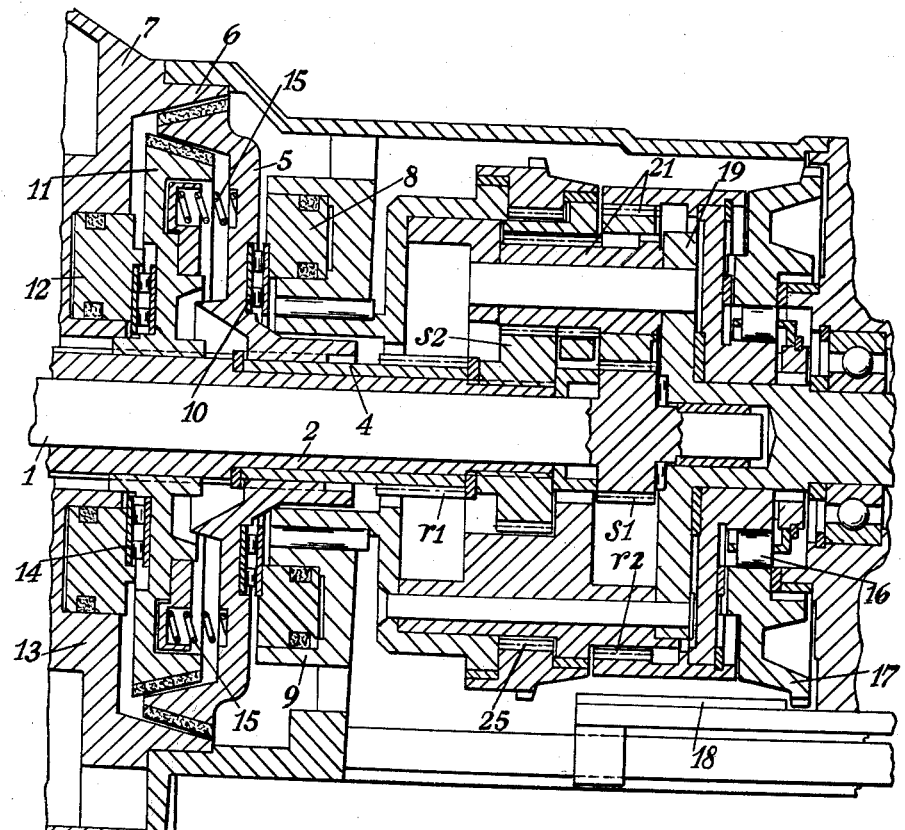
FIGURE 2 is a similar view to FIGURE 1 illustrating an alternative embodiment of the invention.
Figure 2A:
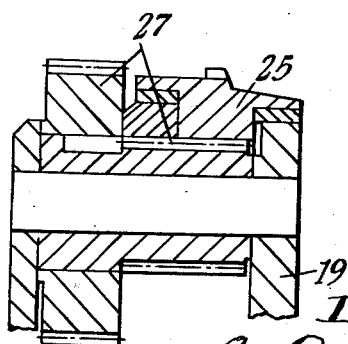
FIGURE 2a is a fragmentary view illustrating a part of the planet pinion arrangement shown in FIGURE 2.

The example illustrated by FIGURES 2 and 2a differs from the example illustrated by FIGURE 1, in that the reaction pinion r2 is substituted by an internally toothed reaction annulus r2, which is controlled by the member 17 and associated unidirection brake 16. The arrangement of the planet pinions is such that one part of the compound planet pinion 21 interengages the sun pinion s1 and reaction annulus r2. The other part of the pinion 21 engages the sun pinion s2. Further, one part of a compound pinion 27 (FIGURE 2a) engages the reaction pinion r1, and the other part engages the reverse motion annulus 25, and a part of a compound planet pinion which engages the sun pinion s2. The clutch member 5 is in this case combined with the reaction sun pinion r1 as in the previously described example.

The mode of action is as follows:

To obtain the first forward speed the input shaft 1 is caused to drive the sun pinion s1, and the reaction annulus r2 is held by engagement of the pawl 18 with the member 17.

The second speed is obtained by causing the input shaft 2 to drive the sun pinion s2, the reaction member r2 remaining locked by the pawl 18.

To obtain the third speed the input shaft 1 is caused to drive the sun pinion s1, and the reaction pinion r1 is locked to the housing by the clutch member 5.

The fourth speed is obtained by causing the input shaft 2 to drive the sun pinion s2, the reaction pinion r1 remaining locked.

To obtain the fifth speed the clutch members 5, 11 are interlocked (the clutch member 5 being released from the housing) so interlocking the pinions s2 and r1.

Reversal of the output shaft is obtained by causing the input shaft 1 to drive the sun pinion s1, and by locking the annulus 25 by the pawl 18, the member 17 being released.

Having thus described my invention what I claim as new and desire to secure by Letters Patent is:

1. For use in an engine-drivable road vehicle having a double clutch, an epicyclic power transmission mechanism of the kind specified comprising in combination a pair of concentric input shafts adapted to be driven by the vehicle engine through different parts of the double clutch, a pair of coaxial sun pinions which are of different diameters, and which are rigidly united respectively with said input shafts, a pair of toothed reaction members which are rotatably supported on the same axis as said input shafts, and which have associated therewith means for controlling rotation thereof, an assembly of planet pinions in engagement with said sun pinions and said toothed reaction members, a power output member in the form of a rotatable carrier on which said planet pinions are mounted, an internally toothed annulus rotatably supported on said axis and engaging at least one of said planet pinions, means for holding said annulus against rotation to cause the normal direction of rotation of said power output member to be reversed, and a friction clutch whereby the outer input shaft is connectible to one of said reaction members.

2. An epicyclic power transmission mechanism according to claim 1, wherein the reaction member connectible by said friction clutch to the outer input shaft has the form of a pinion.

3. An epicyclic power transmission mechanism according to claim 2, wherein the other reaction member has the form of a toothed annulus.

References Cited in the file of this patent
UNITED STATES PATENTS

| | | |
|---|---|---|
| 2,169,523 | Fleischel | Aug. 15, 1939 |
| 2,591,342 | Dodge | Apr. 1, 1952 |
| 2,697,367 | Winther | Dec. 21, 1954 |